United States Patent [19]
O'Haire

[11] Patent Number: 5,941,540
[45] Date of Patent: Aug. 24, 1999

[54] SAFE KNEE BOARD FOR SNOW, WATER OR SAND

[76] Inventor: William F. O'Haire, 601 N. Hayden Rd., Suite 192, Scottsdale, Ariz. 85257

[21] Appl. No.: 09/144,138

[22] Filed: Aug. 31, 1998

Related U.S. Application Data

[63] Continuation-in-part of application No. 09/092,735, Jun. 6, 1998, abandoned.

[51] Int. Cl.$^6$ ..................................................... B62B 13/06
[52] U.S. Cl. ............................................... 280/18; 280/19
[58] Field of Search .................................. 280/606, 607, 280/18.1, 18, 14.2, 27, 14.3, 19; 441/65, 68, 72, 74

[56] References Cited

U.S. PATENT DOCUMENTS

| | | | |
|---|---|---|---|
| 4,028,761 | 6/1977 | Taylor | 280/18 |
| 4,241,929 | 12/1980 | Curry | 280/18 |
| 4,561,664 | 12/1985 | Cashmere | 280/18 |
| 4,666,171 | 5/1987 | Sellers | 280/18 |
| 4,678,445 | 7/1987 | Monreal | 280/18 |
| 4,717,362 | 1/1988 | Pratt | 280/18 |
| 4,805,546 | 2/1989 | Geller et al. | 114/132 |
| 4,883,436 | 11/1989 | Oakland | 441/65 |
| 4,915,400 | 4/1990 | Chambers | 280/14.2 |
| 5,083,955 | 1/1992 | Echols | 441/65 |
| 5,257,953 | 11/1993 | Gillis | 441/74 |
| 5,340,144 | 8/1994 | Eleneke | 280/18 |
| 5,687,977 | 11/1997 | Smith | 280/18 |

*Primary Examiner*—Richard M. Camby

[57] ABSTRACT

A knee board that comprises an elongate board, which is used in combination with a tow rope that defines a grasping loop, having top and bottom surfaces spaced by a thickness of the board, having a pair of slots formed through the thickness thereof proximate the right and left sides thereof with strap segments attached therein, a pair of smoothly rounded rope hooks extending upwardly from the top surface generally proximate the front of the board, and an elongate seat and knee-grip structure extending upwardly from the top surface generally centrally laterally and along a substantial portion of the length of the board is disclosed.

11 Claims, 1 Drawing Sheet

SAFE KNEE BOARD FOR SNOW, WATER OR SAND

CROSS-REFERENCE TO RELATED APPLICATION

This is a continuation in part of application Ser. No. 09/092,735, Filed Jun. 6, 1998, now abandoned, to which priority is claimed.

FIELD OF THE INVENTION

This invention relates to sports equipment and, more specifically, to devices known as knee boards upon which the user kneels and is towed or travels on snow, water or sand.

BACKGROUND OF THE INVENTION

Knee boards of many kinds are well-known and in common use throughout the world. Commonly, knee boards simply comprise a board from a few inches to about two feet wide and from two to four or five feet long that are generally flat along their length with an up-turned front.

The present invention is an improvement in knee boards generally as described with special structural features that make the board safer, more convenient and more enjoyable to use.

SUMMARY OF THE INVENTION

The knee board of this invention is of the type described that comprises an elongate board having top and bottom surfaces spaced by a thickness of the board, front and back ends, and right and left sides. The bottom of the board is generally flat laterally between said sides and flat longitudinally along a substantial part of the length, having an up-turned longitudinal portion toward the front end thereof.

The board has a pair of slots formed through the thickness thereof proximate the right and left sides thereof, respectively approximately equidistant from the back end of the board. Preferably, two or more pairs of such slots are formed at different distances from the end of the board. A strap comprising a pair of strap segments is attached to the board through a pair of slots. One end of each strap segment, respectively, is attached in the slots on the respective sides of the board. The strap segments are constructed and arranged such that the other ends of the respective strap segments can be connected together to form a strap of variable length.

At least one smoothly rounded rope hook extends upwardly from the top surface generally proximate the front end of the board. Preferably, a pair of such hooks spaced generally equally from the sides of the board are provided. The hook or hooks are, respectively, so constructed and configured to loosely retain a rope therein when the board is at rest and to release the rope easily if the board is in motion. These hooks are smooth and rounded so that the rope, usually a loop of rope, will be retained therein while the user mounts the board and present the rope for being grasped by the user. The hooks are, however, shallow enough and so configured that the rope will be readily disengaged by any significant uneven motion of the board. Thus, if the user is to be towed and the towing boat or vehicle moves significantly before the user grasps the rope, the rope will simply slip out of the hook before the board is moved any significant distance. Any uneven movement of the board or the rope will cause the rope to disengage the hook or hooks.

Another important feature of the board of this invention is an elongate seat and knee-grip structure extending upwardly from the top surface generally centrally laterally and along a substantial portion of the length of the board. This structure is a few inches high and, variably, a few inches wide running from generally proximate the rear of the board toward the front of the board beyond the center, longitudinally, of the board and, preferably, to proximate the beginning of the upturn of the front of the board.

These and other features of the invention will be more fully shown in the drawings to which reference is now made.

DESCRIPTION OF THE PREFERRED EMBODIMENTS

Figures 1, 2, 3, 4, 5:
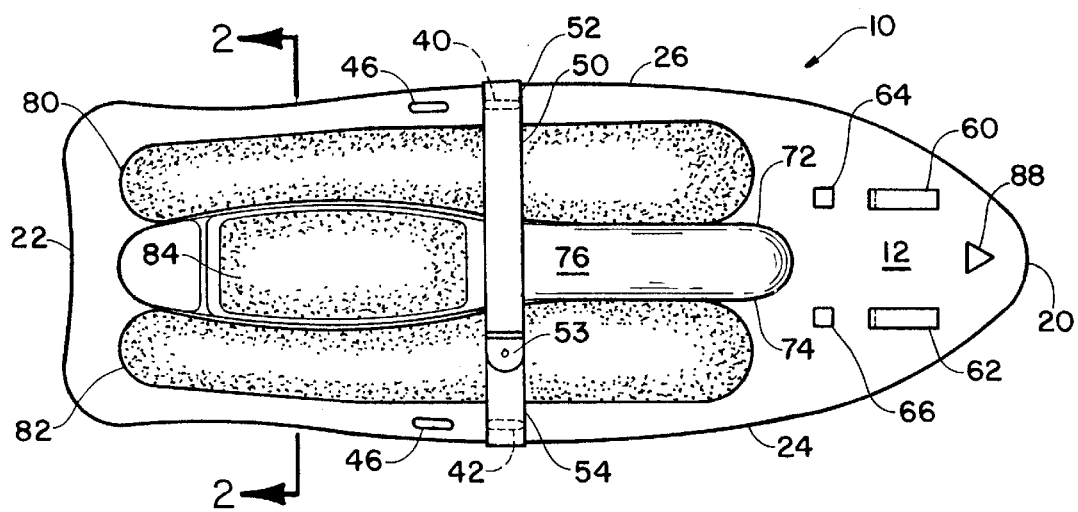
FIG. 1 is a top plan view of the knee board of this invention.
FIG. 2 is a cross-sectional view of the knee board taken along lines 2—2 in FIG. 1.
FIG. 3 is a side elevational view of the knee board.
FIG. 4 is a bottom view of the knee board of this invention.
FIG. 5 is an enlarged view of the front of the knee board showing the combination of a tow rope and tow rope support structure.

The knee board of this invention is of the type described that comprises an elongate board 10 having a top 12 and a bottom 14 surfaces spaced by a thickness 16 of the board. The board has a front end 20 and a back end 22, and a right side 24 and a left side 26, as viewed from the top, looking from the back end to the front end.

The bottom of the board is generally flat laterally between said sides and generally flat longitudinally along a substantial part of the length. The board has a longitudinal frontal upturned portion 32 and a rear upturned portion 34. The upturned portion 32 generally is longer than the rear upturned portion, but this is not a critical aspect of the invention.

The board has a pair of slots 40 and 42 formed through the thickness 16 thereof proximate the right and left sides thereof, respectively, approximately equidistant from the back end of the board. Preferably, two or more pairs of such slots are formed at different distances from the end of the board, such as are shown at 44 and 46 in FIG. 1. A strap 50 comprising a pair of strap segments 52 and 54 is attached to the board through a pair of slots, slots 40 and 42 in FIG. 1. One end of each strap segment, respectively, is attached in the slots on the respective sides of the board. The strap segments 52 and 54 are constructed and arranged such that the other ends of the respective strap segments can be connected together to form a strap of variable length. The straps may simply be lengths of rope run through the slots that can be tied at any length; however, flat straps having hook and loop type fasteners, e.g. the well-known VEL-CRO® fasteners, sewn or bonded thereto are preferred. A single pair of hook and loop fasteners may be provided or a separate pair of hook and loop fasteners for attachment to the board and for attachment over the board may be provided. In the presently most preferred configuration, the straps are about four inches wide and padded with Velcro fasteners, providing convenience, comfort and safety. In a preferred embodiment, the straps are connected together by a insertion snap fastener 53. These fasteners are well known for fastening back pack straps, etc.

At least one smoothly rounded rope hook extends upwardly from the top surface generally proximate the front and of the board. Preferably, a pair of such hooks, as shown at 60 and 62 in FIG. 1, that are spaced generally equally from the sides of the board are provided. The hook or hooks are, respectively, so constructed and configured to loosely retain a rope therein when the board is at rest and to release the rope easily if the board is in motion. These hooks are smooth and rounded so that the rope, usually a loop of rope, will be retained therein while the user mounts the board and present the rope for being grasped by the user. The hooks are, however, shallow enough and so configured that the rope will be readily disengaged by any significant uneven motion of the board. Thus, if the user is to be towed and the towing boat or vehicle moves significantly before the user grasps the rope, the rope will simply slip out of the hook before the board is moved any significant distance. Any uneven movement of the board or the rope will cause the rope to disengage the hook or hooks. In the preferred embodiment, one or a pair of rope stops 64 and 66, see FIG. 1, are provided to fix the location of the rope.

It will be understood from the drawing and the foregoing that the purpose of the rope hooks and stops is to position the rope to be easily grasped by the user when the user is ready to be towed and not for towing the board per se. The construction of the hooks to perform this function and to release the rope if there is any substantial or uneven movement of the board or rope is a very important convenience and safety feature of the knee board as described and claimed herein.

Another important feature of the board of this invention is an elongate seat and knee-grip structure 70 extending upwardly from the top surface generally centrally laterally and along a substantial portion of the length of the board. This structure is a few inches high, e.g. three to eight inches, and, variably, a few inches, e.g. two to eight inches, wide running from generally proximate the rear of the board toward the front of the board beyond the center, longitudinally, of the board and, preferably, to proximate the beginning of the upturn of the front of the board. The structure 70 may be of any of several general configurations but in a preferred embodiment, the structure comprises opposed, generally vertical sides 72 and 74 to support a seat-forming surface 76 and for being gripped by the user's knees when the board is in use. This permits the user to sit comfortably, to grip the board and to distribute his or her weight between the knees and the seat. As shown in FIG. 1, the strap is positioned to extend over the legs of the user between the knees and the hips. Depending on the size of the user and the user's preference, the straps may be near the knees or in the hip joint area near the user's waist or at any comfortable position in between. The straps may be fitted into any of the sets of slots to provide the greatest comfort and safety for the user.

In the preferred embodiment, a plurality of pads of foam, felt, fabric or other material are bonded or secured to the board. Pads 80 and 82 are secured to the top surface of the board and pad 84 is secured on the seat structure. Such material may be of considerable thickness, e.g., up to an inch or so, or they may be quite thin, as needed or desired for comfort and to prevent the users knees from slipping on the board surface. As shown in FIG. 3, pads, e.g. pad 86, may also be provided in the knee grip area of the sides of the seat structure The board preferably has a passage or hole 88 formed through the thickness thereof, the hole being formed and dimensioned to receive a rope. It is not intended that the board be towed by a vehicle during use; however, it is very convenient for the user to have a short length of rope attached to pull the board in the snow, etc., or on sand, or simply to tie the board onto a load of sporting equipment.

The board also preferably has formed therein a plurality of grooves 90, 91, 92, 93, 94 and 95 in the front of the bottom surface. These grooves, shown in FIG. 4, guide the board in a straight path. Being formed in the upturn at the front of the board, the user can simply lean back to lift the front and lean to one side or the other to guide the board, free of the effect of the grooves, in a direction to the left or to the right as desired.

Referring now specifically to FIGS. 1 and 5, the one of the important safety and convenience features of the invention can be seen. While tow ropes may be in virtually any convenient configuration, it is common to provide a gripping loop at the end grasped by the user. This may simply be a loop, or it may be a loop containing gripping bar such as shown in FIG. 5, wherein the gripping bar 100 through which the rope portions 104 and 106 of rope 102 may pass or to which they may be attached by means attachments 108 and 110. The operation, convenience and safety of the board and rope combination are basically the same whether or not the rope contains a gripping bar, but the gripping bar containing rope loop is preferred.

In use, the loop of the tow rope is placed adjacent the hooks 60 and 62 and in front of the stops 64 and 66. This positions the rope so that the user can grasp it when he or she has mounted the board. One of the most difficult to master techniques in knee boarding is holding on to the rope and trying with the remaining free hand to hold the board in position while mounting the board. The combination of the board hood structure with the rope loop engaging the hooks obviates this difficult maneuver. The user has both hands free and can grasp the rope remove it from the hooks simply by lifting and signal the tow boat or vehicle to start so that he or she can skim across the surface with grace and ease.

As shown in FIG. 2, the board is, in cross-section, preferably made in the form of a generally hollow shell of any desired material. The preferred materials are high density polyethylene, polypropylene, ABS resins, polyester, resin bonded fiberglass, etc. Many such materials are known and can be spin cast or otherwise formed by any of several techniques. The board may be filled with a light, rigid foam material to increase the stability of the structure.

While size is not critical, the board is preferably from about 15 to about 20 inches wide, but may be wider, and from about three to five feet in length. As shown in the drawings, the front end tapers up and is configured and constructed to define a rounded point on the front end and a pair or rounded projections on the back end. These features provide better control and handling as well as presenting an attractive looking product.

Among the features that are of importance are the following:

Referring to FIG. 2, which is a cross sect ion through the seat area, note that the seat gets narrower toward the front, and also slopes down toward the front. This feature makes the seat most acceptable for larger or smaller riders.

The hook, in the form of an upstanding structure defining a recessed notch in the nose of the board, is used for the tow rope handle or support. By a light pull backward and up, the tow rope handle quickly releases. With the rope released from the board the rider can easily steer the board as he or she desires by leaning left or right.

The area on both sides of the board is padded with a layer sponge rubber. This is provided for the riders comfort, to stand up on or to kneel on.

Note that all co-corners are rounded and smooth. This is for appearance, and to assure that the seat area is comfortable for the rider.

Note that the front few inches of the underside of the board slopes up. This is true of the rear area as well. This feature makes the board go thru the water or snow in a very easy smooth manner.

An important comfort and safety feature is the adjustable length tie down strap that extends over the riders thigh area, between the knee and up to the hip area, as the rider may prefer. The two portions of the strap structure attach to each other to form a variable length strap for quick release and to fit the riders size.

There are two holes through both sides of the board which allow the rider, whether large or small, to fit the position of the strap to his or her body for the most comfortable position.

A hole through the front of the board allows the user or another person to pull the board by a rope, which would be secured and tied through this hole. This is an especially advantageous feature when the board is being pulled thru snow areas.

In the front of the bottom of the board are several indents. These act somewhat like the keel of a boat and help the rider keep the board going in a straight direction at lower speeds. However the rider can easily over come this effect by raising the nose slightly and by leaning in the direction he wishes to move.

Note the area, shown in FIGS. 1 and 3, in which the seat on the board narrows and slopes to the front of the board. Similarly, the back end of the seat structure slopes downwardly from the seat. These features are more than esthetic, although they do result in an attractive product. These sloping ends make the board easy to handle and control and reduces the likelihood of an injury.

Note that the general bottom area of the board is smooth. This allows the rider to turn the board very easily, and makes it much easier for the rider to do unusual, exhibition or tricky maneuvers.

The knee board of this invention is shaped to provide performance and versatility for all users and all levels of riding skill. It is stable, yet responsive, permits easy starts and maximum edge control while carving turns in water, snow or sand. It has a low profile for greater holding power, enabling users to convert easily from trick to slalom styles. The high performance seat and gripper pads and padded strap provide maximum comfort and control.

Industrial Application

This invention is useful in the sporting goods industry.

What is claimed is:

1. In a knee board that comprises an elongate board having a top surface and a bottom surface spaced by a thickness of the board, a front end and a back end, and right and left sides, the bottom of said board being generally flat laterally between said sides and being generally flat longitudinally along a substantial part of the length thereof, the board being up-turned toward the front end thereof, the improvement wherein: the board is configured and constructed to define at least one smoothly rounded rope hook structure extending upwardly from the top surface generally proximate the front and of the board, said hook structure being constructed and configured to loosely retain a rope therein when the board is at rest, to present the rope for being easily grasped by the user and removed from engagement with the hook when the rope is lifted and to release the rope easily if the board is in motion and further comprising a unitary elongate structure extending upwardly from the top surface generally centrally laterally of the board beginning distally from the front end of the board behind said hook and extending along a substantial portion of the length of the board to proximate the rear end of the board, said structure being configured and constructed to define a knee-grip portion proximate the hook structure and a seat structure distal from the hook structure.

2. In a knee board that comprises an elongate board having a top surface and a bottom surface spaced by a thickness of the board, a front end and a back end, and right and left sides, the bottom of said board being generally flat laterally between said sides and being generally flat longitudinally along a substantial part of the length thereof, the board being up-turned toward the front end thereof, the improvement wherein the board is configured and constructed to define elongate knee-grip structure extending generally vertically upwardly from the top surface generally centrally laterally of the board beginning distally from the front end of the board and extending along a substantial portion of the length of the board to proximate the rear end of the board, and further comprising pads on the opposed generally vertical walls and a plurality of pads positioned and located for supporting the knees of the user during use.

3. The invention of claim 2 further comprising a pair of upstanding structures, each of which is constructed and configured to define a recessed notch, said structures being position proximate the front of the board in front of the knee grip portion for engaging and supporting a rope, said structures being so constructed and configured as to permit the user by a light pull backward and up to release the tow rope therefrom, and to position the rope to be easily grasped by the user when the user is ready to be towed.

4. The invention of claim 3 wherein the board has a pair of slots formed through the thickness thereof proximate the right and left sides thereof, respectively; said slots being approximately equidistant from the back end of the board and further comprising a pair of padded strap segments, one end of each strap segment, respectively, being attached in said slots, said strap segments being constructed and arranged that the other ends of the respective strap segments can be connected together to form a strap of variable length.

5. The invention of claim 1 wherein the board has a pair of slots formed through the thickness thereof proximate the right and left sides thereof, respectively; said slots being approximately equidistant from the back end of the board and further comprising a pair of padded strap segments, one end of each strap segment, respectively, being attached in said slots, said strap segments being constructed and arranged that the other ends of the respective strap segments can be connected together to form a strap of variable length.

6. The invention of claim 2 wherein the board has a pair of slots formed through the thickness thereof proximate the right and left sides thereof, respectively; said slots being approximately equidistant from the back end of the board and further comprising a pair of padded strap segments, one end of each strap segment, respectively, being attached in said slots, said strap segments being constructed and arranged that the other ends of the respective strap segments can be connected together to form a strap of variable length.

7. The invention of claim 3 wherein the board has a pair of slots formed through the thickness thereof proximate the right and left sides thereof, respectively; said slots being approximately equidistant from the back end of the board and further comprising a pair of padded strap segments, one end of each strap segment, respectively, being attached in said slots, said strap segments being constructed and arranged that the other ends of the respective strap segments can be connected together to form a strap of variable length.

8. In combination, a tow rope that is configured and constructed to define a grasping loop for being grasped by the user temporarily secured to a knee board that comprises an elongate board having a top surface and a bottom surface spaced by a thickness of the board, a front end and a back end, and right and left sides, the bottom of said board being generally flat laterally between said sides and being flat longitudinally along a substantial part of the length thereof and up-turned toward the front end thereof and comprising at least one smoothly rounded rope hook structure extending upwardly from the top surface generally proximate the front end of the board, said hook structure being constructed and configured to loosely retain said rope therein when the board is at rest, to present the rope for being easily grasped by the user and removed from engagement with the hook simply by lifting the rope and to release the rope easily if the board is in motion, said rope being temporarily secured to the knee board by said hook structure and further comprising a unitary elongate seat and knee-grip structure extending upwardly from the top surface generally centrally laterally of the board beginning distally from the front end of the board behind said hook and extending along a substantial portion of the length of the board to proximate the rear end of the board, pads on the opposed generally vertical walls and a plurality of pads positioned and located for supporting the knees of the user during use.

9. The combination of claim 8 wherein the hook structure comprises a pair of upstanding structures, each of which is constructed and configured to define a recessed notch, said structures being position proximate the front of the board in front of the knee grip portion for engaging and supporting a rope, said structures being so constructed and configured as to permit the user by a light pull backward and up to release the tow rope therefrom, and to position the rope to be easily grasped by the user when the user is ready to be towed.

10. The invention of claim 3 further comprising a pair of rope stops extending from the upper surface of the board spaced rearwardly from the respective upstanding hook structures and being positioned and constructed to retain the rope loop temporarily in engagement with said hook structures.

11. The combination of claim 8 further comprising a pair of rope stops extending from the upper surface of the board spaced rearwardly from the respective upstanding hook structures and being positioned and constructed to retain the rope loop temporarily in engagement with said hook structures.

\* \* \* \* \*